(12) United States Patent
Franz

(10) Patent No.: US 10,189,590 B2
(45) Date of Patent: Jan. 29, 2019

(54) METHOD FOR PACKAGING LIQUID OR PASTY PRODUCTS AND PACKAGING MACHINE SUITABLE FOR THIS PURPOSE

(71) Applicant: Benhil GmbH, Neuss (DE)

(72) Inventor: Maik Franz, Moenchengladbach (DE)

(73) Assignee: Benhil GmbH, Neuss (DE)

( * ) Notice: Subject to any disclaimer, the term of this patent is extended or adjusted under 35 U.S.C. 154(b) by 180 days.

(21) Appl. No.: 15/328,909

(22) PCT Filed: Jul. 29, 2015

(86) PCT No.: PCT/EP2015/001559
§ 371 (c)(1),
(2) Date: Jan. 25, 2017

(87) PCT Pub. No.: WO2016/015861
PCT Pub. Date: Feb. 4, 2016

(65) Prior Publication Data
US 2017/0217614 A1  Aug. 3, 2017

(30) Foreign Application Priority Data
Jul. 30, 2014 (DE) .......................... 10 2014 011 075

(51) Int. Cl.
*B65B 37/06* (2006.01)
*B65B 3/32* (2006.01)
(Continued)

(52) U.S. Cl.
CPC ................ *B65B 37/06* (2013.01); *B65B 3/12* (2013.01); *B65B 3/32* (2013.01); *B65B 37/20* (2013.01);
(Continued)

(58) Field of Classification Search
CPC ....... B65B 37/06; B65B 37/20; B65B 39/001; B65B 39/003; B65B 3/32; B65B 3/12; B65B 43/59; B65B 2210/06; G01F 11/16
See application file for complete search history.

(56) References Cited

U.S. PATENT DOCUMENTS 3,065,775 A * 11/1962 Keves ................... B65B 39/001
141/131
3,979,021 A   9/1976 Reinecke
(Continued)

FOREIGN PATENT DOCUMENTS

DE    27 11 208    9/1978
DE    28 24 680    12/1979
(Continued)

*Primary Examiner* — Nicolas A Arnett
(74) *Attorney, Agent, or Firm* — Paul Vincent

(57) ABSTRACT

A method for the portioned packaging of liquid or pasty products using a packaging machine. The product is fed via an inlet to a metering chamber, being metered in the metering chamber by a metering member to form a product portion, and the product portion being fed via a metering outlet to a package. In order to avoid impairments of products which are sensitive to crystallizing out in the inoperative state, the metering chamber is operated in continuous flow in at least one operating state of the packaging machine from the following group: downtimes of the packaging machine, start-up of the packaging machine and operation of the packaging machine, by the product—whether entirely or in a partial flow—being removed entirely or partially from the metering chamber past the metering member via an outlet provided in addition to the metering outlet and being recirculated.

18 Claims, 3 Drawing Sheets

(51) Int. Cl.
  *B65B 37/20* (2006.01)
  *B65B 39/00* (2006.01)
  *B65B 43/59* (2006.01)
  *B65B 3/12* (2006.01)
  *G01F 11/16* (2006.01)
(52) U.S. Cl.
  CPC .......... *B65B 39/001* (2013.01); *B65B 39/003* (2013.01); *B65B 43/59* (2013.01); *G01F 11/16* (2013.01); *B65B 2210/06* (2013.01)

(56) References Cited

U.S. PATENT DOCUMENTS

| | | | | | |
|---|---|---|---|---|---|
| 4,235,265 | A | * | 11/1980 | Feliks | B65B 55/02 141/264 |
| 4,293,010 | A | * | 10/1981 | Winiasz | B67C 3/206 137/625.27 |
| 4,913,202 | A | * | 4/1990 | Miller | B65B 3/326 141/258 |
| 5,065,910 | A | * | 11/1991 | Fiedler | B05C 5/0229 141/117 |
| 5,080,148 | A | * | 1/1992 | Florida | B65B 3/32 141/258 |
| 5,127,449 | A | * | 7/1992 | Mueller | B65B 3/32 141/1 |
| 5,996,652 | A | * | 12/1999 | Schromm | B65B 3/326 141/100 |
| 6,257,286 | B1 | * | 7/2001 | Gaetano | B65B 3/12 141/129 |
| 6,378,734 | B1 | * | 4/2002 | Ragsdale | B01F 15/0203 222/108 |
| 2009/0151814 | A1 | * | 6/2009 | Kelly | B05B 1/3046 141/286 |
| 2010/0025426 | A1 | | 2/2010 | Wild | |

FOREIGN PATENT DOCUMENTS

| | | |
|---|---|---|
| DE | 198 01 405 | 7/1999 |
| DE | 10 2008 032 689 | 1/2010 |
| GB | 2 450 955 | 1/2009 |
| WO | WO 01/14209 | 3/2001 |
| WO | WO 2007/118676 | 10/2007 |
| WO | WO 2008/116526 | 10/2008 |

\* cited by examiner

METHOD FOR PACKAGING LIQUID OR PASTY PRODUCTS AND PACKAGING MACHINE SUITABLE FOR THIS PURPOSE This application is the national stage of PCT/EP2015/001559, filed on Jul. 29, 2015 and claiming Paris convention priority from DE 10 2014 011 075.3, filed Jul. 30, 2014.

BACKGROUND OF THE INVENTION

The invention relates to a method for the portioned packaging of liquid and/or pasty products by means of a packaging machine by the product being fed via at least one inlet of a metering chamber, being metered in the metering chamber by means of at least one metering member with an axially shiftable metering piston to form at least one product portion, and the at least one product portion being fed via at least one metering outlet to a package wherein the metering chamber is operated in a continuous flow in at least one operating state of the packaging machine from the following group
downtimes of the packaging machine,
start-up of the packaging machine, and
operation of the packaging machine,
by the product being removed entirely or partially from the metering chamber via at least one outlet and being recirculated. The invention furthermore relates to a packaging machine, which is suitable in particular for carrying out such a method, for the portioned packaging of liquid and/or pasty products, with at least one metering chamber with at least one inlet in order to meet the product to the metering chamber, at least one metering member which is arranged in the metering chamber and has an axially shiftable metering piston for metering at least one product portion, and with at least one metering outlet in order to feed the product portion to a package, wherein the metering chamber furthermore has at least one outlet which leads into a recirculation line, wherein the product can be supplied to the metering chamber via the at least one inlet and can be entirely or partially removed via the at least one outlet into the recirculation line.

Packaging machines of the abovementioned type are known in particular for packaging metered product portions of pasty products, such as, for example, butter, margarine and the like, and are commercially available in the applicant's business under the trade name "M8000". Packaging machines of this type have one or else more metering chambers which are arranged in parallel and to which the pasty product is cyclically supplied via one inlet (each). A metering member, for example in the form of an axially shiftable piston, is located in the metering chamber or the metering chambers and is capable of discharging the pasty product out of the previously filled metering chamber via a metering outlet of same, after which the metered product portion is fed to a package, such as, for example, an upwardly open blank of a wrapper, a cup or the like, which package is guided past the metering chamber, for example, in lifting cells arranged below the metering outlet of the metering chamber. Such packaging machines have also proven best, not least because of their high degree of sturdiness and efficiency, for packaging pasty products from the foodstuffs sector that have to satisfy exacting requirements imposed on hygiene.

In the meantime, it has been shown that some pasty products in the inoperative state have a tendency to crystallize out relatively rapidly, wherein mention may be made by way of example of some types of margarine in which, in particular in the heated, slightly viscous to liquid state, the oil-in-water emulsion separates out very rapidly and oil or fat crystals form which are not (no longer) dissolved in the aqueous "solvent". The same applies, for example, to ice cream if, in the inoperative state, i.e. when the pasty mass is not stirred or moved in some other way, especially the aqueous phase crystallizes out.

Furthermore, it has been shown that the abovementioned problem can be manifested in the case of packaging machines of the type in question in that, in the event of processing such products which are highly sensitive in respect of separating out or crystallizing out, in particular during temporary and also brief downtimes of the packaging machine or during restarting of same, erroneous meterings and/or defective product portions occur which have to be sluiced out and disposed of because the product residues remaining in the packaging machine no longer have the required quality. Consequently, the packaging machine should be entirely flushed prior to each start-up, which is complicated and leads to undesirable downtimes. The same may be the case in the event of very slow metering and an associated, very slow supply of product into the metering chamber, wherein slow meterings may, on the other hand, be required if the pasty product is also sensitive to the mechanical forces brought about thereon in the metering chamber by the metering member. On the other hand, the packaging machine should, however, nevertheless be easy and rapid to clean without having to be disassembled and reassembled in a complicated manner. The structural design of the packaging machine should in particular permit what is referred to as "Cleaning In Place" ("CIP") in order, for example in the case of product changes or else for hygiene reasons, to be able to clean at least those components of the packaging machine which enter into contact with the product at regular intervals in situ.

U.S. Pat. No. 3,979,012 A describes a packaging machine of the type in question which is provided in particular for packaging sensitive, pasty products, such as margarine, that have a tendency to crystallize out. The known packaging machine comprises two metering members in the form of two metering pistons which, in one rotary slide each, which forms the metering chamber, are shiftable in the axial direction of the rotary slide. The metering chambers of the rotary slides lead into a common outlet nozzle, at the outlet-side end of which an outlet rotary valve is arranged. In order to keep the product always in motion during the operation and to thereby counter an untimely crystallizing out, the product is always circulated, wherein the circulating line has a line portion from where the product enters the rotary slide, which is arranged downstream of said line portion, in order to be fed to a package via the outlet nozzle by shifting of the metering piston guided displaceably in said rotary slide. Consequently, in particular during downtimes of the packaging machine, for example at night, or else in the event of only brief operating interruptions, there is, as before, the problem that the product crystallizes out in the rotary slides forming the metering chambers, whereupon the rotary slides have to be completely disassembled, cleaned and reassembled because even "CIP" cleaning is not possible in situ. The latter is caused especially by the fact that the rotary slides cannot be flushed through with a cleaning medium either in the position in which they open toward the line portion of the circulating line or in the position in which they open toward the outlet nozzle, particularly since the product also passes between the outer circumferential surface of the rotary slides, which is always in contact with said product, and the bearing shells of said rotary slides which cannot be cleaned at all in the fitted state.

The same applies very substantially to a metering device, which is known from WO 2007/118676 A1, for liquid or pasty products, which metering device can be used, inter alia, in packaging machines. Similarly as in the US document mentioned above, the metering device has a line portion through which the product always flows, wherein a metering chamber branches off from the line portion in the radial direction. In this case, the metering member is arranged in the line portion and comprises a metering piston with a piston rod which is of hollow design and, at its free end, has an inlet opening for feeding in a sterilizing agent, and also a valve spindle which is likewise hollow and surrounds the piston rod on the outer or circumferential side. That region of the metering device which is located within the valve spindle does not come into contact with the product and serves exclusively for adding the sterilizing agent during each metering operation. During a metering operation, a valve body, which is arranged on the outer side of the valve spindle, is brought into sealing contact with the mouth region of the branching of the line portion into the metering chamber and the metering piston is pushed into the metering chamber in order to press the product portion located there out of the metering chamber. Apart from the fact that the known metering device, because of the fixedly predetermined size of the metering chamber, is capable only of metering a corresponding, fixedly predetermined product portion, there is in particular the disadvantage, even in this case—if sensitive products of the abovementioned type are intended to be processed—that, even during short downtimes, the product crystallizes out in the metering chamber, after which the metering chamber has to be cleaned.

GB 2 450 955 A describes a dispenser for metering fluid substances, the dispenser having one or more metering members. If a plurality of metering members are provided, the latter are arranged in one line portion each of a product-conducting line into the two opposite ends of which the product is fed, and therefore a partial flow of the product provided for the inner metering member passes the respectively outer metering members. Each metering member then meters a desired product portion before said product portion is removed via a respective metering outlet. The metering members are arranged in the form of a type of piston/cylinder arrangement projecting into the product-conducting line portion. However, processing of in particular products of the abovementioned type that are sensitive to rapid crystallization is not possible by means of the known dispenser for a number of reasons. Although, firstly, some metering members—the outer metering members—are operated in continuous flow because of their series connection, a desired partial flow which passes said metering members can nevertheless not be set since said partial flow is fixedly predetermined by the necessary metering volume of the middle metering member which cannot be operated in continuous flow. Secondly, in the event of even only short downtimes of the dispenser, the product which is sensitive in respect of crystallizing out would directly crystallize out because said product can only be removed from the line portion equipped with the metering members via the metering outlets, from where said product would have to be discarded.

WO 01/14209 A1 finally involves a hygienic dispenser which is provided for the metered dispensing of viscous foodstuffs and in which the foodstuffs are intended always to be kept in a continuous flux during the operation and during downtimes. The dispenser has a metering chamber which accommodates a cylinder with a piston shiftable axially therein, as the metering member. The liquid or viscous product passes via an input-side passage into the dispenser and from there via an inlet valve into the metering chamber where said product is metered by means of the piston. The product then leaves the metering chamber via an outlet valve arranged next to the inlet valve in the radial direction and passes into an output-side passage which is arranged parallel to the input-side passage and is connected to one or more metering tips which are inserted interchangeably into the output-side passage. The output-side passage finally leads downstream of the metering chamber provided with the metering piston into a recirculation line, wherein the liquid—viscous foodstuff can be entirely or partially recirculated by only one product portion being transferred from the output-side passage into the metering tips while the rest of the product passes downstream of the output-side passage into the recirculation line and is fed again from there to the input-side passage. However, it has proven disadvantageous firstly that circulation of the product through the metering chamber during downtimes of the dispenser appears to be possible only when the metering piston remains continuously in operation because the piston stroke is absolutely necessary for pumping the product through the metering chamber, which in turn means that the setting of a desired ratio of metered and recirculated product is not possible. Secondly, the known dispenser does not permit what is referred to as CIP cleaning, during which said dispenser could be flushed by means of a cleaning fluid without having to disassemble the dispenser. Said disassembly is caused by the fact that the metering piston which enters into contact on its lower end side with the product located in the metering chamber, if the metering chamber including its feed and removal lines is flushed with a cleaning fluid, can also come into contact only on its lower end side with the cleaning fluid, and therefore product residues which have been concentrated radially between the metering piston and the circumferential wall of the metering chamber after a plurality of piston strokes cannot be completely removed, as would absolutely be necessary, however, for foodstuff applications.

The invention is based on the object of developing a method for the portioned packaging of liquid and/or pasty products of the type mentioned at the beginning and a packaging machine of the type in question that is suitable in particular for carrying out such a method, in a simple and cost-effective manner to the effect that the problem of products sensitive to crystallizing out can be effectively countered while at least very substantially avoiding the aforementioned disadvantages, wherein in particular also simple "CIP" cleaning is intended to be ensured.

SUMMARY OF THE INVENTION

In terms of a method, this object is achieved in the case of a method of the type mentioned at the beginning in that the product flows through the metering chamber in the axial direction by said product being fed to its at least one end via the at least one inlet and being removed from its other end via the at least one outlet, wherein the product is guided past the at least one metering member through an annular gap formed between the at least one metering member located in the metering chamber and the inner circumferential wall of the metering chamber, and therefore said product flushes around the metering member.

In terms of an apparatus, to achieve this object in the case of a packaging machine of the type mentioned at the beginning, the invention furthermore provides that the at least one inlet and the at least one outlet are arranged at ends of the metering chamber that are opposite in the axial direction, wherein the at least one metering member is arranged at a radial distance from the circumferential wall of the metering chamber, and therefore the product can be guided past the at least one metering member through an annular gap formed between the at least one metering member located in the metering chamber and the inner circumferential wall of the metering chamber.

The configuration according to the invention, according to which the product—whether entirely or in partial flow—is removed from the metering chamber via at least one outlet, which is provided in addition to the metering outlet or to the metering outlets, and is recirculated, or according to which the metering chamber, in addition to the at least one metering outlet, has at least one (further) outlet leading into a recirculation line, makes it possible in a simple manner to convey even highly sensitive pasty products in critical operating states of the packaging machines, in which there is the risk of (too) low agitation or movement of the product and consequently of separating out or crystallization of same (for example during downtimes, during the start-up or during an operation associated in particular with a slow supply of product), at least in a partial flow, which can be selected and preset more or less as desired, up to the entire product flow through the metering chamber during such operating phases, and therefore the product can always be kept in a satisfactorily homogenized state and possible flushing of the packaging machine can be reduced to the hygienically required minimum amount. As explained in more detail further below, the pasty product entirely or partially passes here through the entire metering chamber, including the inlet and outlet lines thereof, wherein a possible dead space for possible product residues are formed only downstream of the metering outlet or of the metering outlets, such as, for example, in an outlet valve and/or in a metering tip, but these can, if required, be cleaned simply and rapidly separately without cleaning or flushing of all of the machine parts coming into contact with the product and in particular without removal of said machine parts being required. The product (partial) flow removed from the outlet is then recirculated, and therefore the product can in particular be circulated and that product portion which is provided for the near "flow" through the metering chamber can be reused. In this connection, "start-up of the packaging machine" furthermore does not necessarily mean the first start-up after the installation of the packaging machine, but rather any start-up following any downtime, including starting or restarting of the packaging machine after relatively short downtimes, for example after cleaning, a product change or after a temporary downtime when full utilization is not required, for example during the night. The arrangement of the metering member in the interior of the metering chamber also ensures here that the product flow flows constantly around the metering member, and therefore product residues which could separate out and/or crystallize out are not formed there either during normal operation or during downtimes of the packaging machine.

The configuration according to the invention consequently also permits simple cleaning in the manner of what is referred to as "Cleaning In Place" ("CIP") without parts of the feed lines and removal lines and in particular the metering members having to be disassembled because the metering chamber with the metering member arranged therein may if required also be flushed through with a cleaning solution instead of the product.

In order to ensure a particularly effective "flushing" of the metering chamber with the product flow without there being the risk of local enrichment of deposited product residues, the invention provides that the product flows through the metering chamber in the axial direction by said product being fed to its at least one end via the at least one inlet and being removed from its other end via the at least one outlet. In respect of the apparatus, this means that the at least one inlet and the at least one outlet are arranged at opposite ends of the metering chamber in the axial direction. This results at the same time in the possibility of very thorough "CIP" cleaning because the metering chamber can always be flushed through in the axial direction with a cleaning solution because of the inlets and outlets which are arranged with a vertical offset, and therefore the metering member can likewise be flushed through in its direction of action with such a cleaning solution.

In order, even during the operation, to permit a partial flow of the product supplied to the metering chamber but not metered via the at least one metering outlet to flow through the metering chamber, the at least one metering member is furthermore arranged according to the invention at a radial distance from the circumferential wall of the metering chamber. Consequently, an annular gap is provided between the at least one metering member located in the metering chamber and the inner circumferential wall of the metering chamber, through which annular gap the product can flow from the at least one inlet to the at least one outlet by said product flushing around the metering member. Such a configuration also proves advantageous in respect of basic "CIP" cleaning since the metering member arranged in the metering chamber can then be flushed in the direction of action thereof with a cleaning solution both through said metering member and also in particular therearound.

In order, in any operating states of the packaging machine, always to reliably eliminate the risk of product impairment as a consequence of separating out or crystallizing out because of local product enrichments, it can be provided, in an advantageous refinement, that the metering chamber is operated in continuous flow both during downtimes and/or upon start-up—including (re-)starting—of the packaging machine and also during the operation of the packaging machine. It can be provided in particular here that, for example during downtimes and/or upon start-up of the packaging machine, the entire product flow supplied to the metering chamber via the at least one inlet thereof is removed again past the at least one metering member via the outlet according to the invention of said metering chamber and recirculated (entire throughflow) while, for example during the operation of the packaging machine, a larger product flow is fed to the metering chamber via its at least one inlet than is intended to be metered via the at least one metering outlet and the differential flow is in turn removed past the at least one metering member via the outlet according to the invention of said metering chamber and recirculated (partial throughflow).

With regard to the flow through the metering chamber in the axial direction, it can preferably be provided that the product is fed to the lower end of the metering chamber and/or end facing the at least one metering outlet via the at least one inlet and is removed from the upper end of the metering chamber and/or end facing away from the at least one metering outlet via the at least one outlet.

With regard to the apparatus, it can be provided for this purpose that the at least one inlet is arranged at the lower end and/or end facing the at least one metering outlet, and the at least one outlet is arranged at the upper end and/or end facing away from the at least one metering outlet, of the metering chamber.

As already indicated, for the reasons mentioned, it can be provided, in an advantageous configuration, that a greater product flow is fed to the metering chamber during the operation, in particular substantially continuously, via the at least one inlet than is removed in a portioned manner therefrom via the at least one metering outlet, wherein the portion of the product flow fed to the metering chamber that is not removed in a portioned manner therefrom via the at least one metering outlet is removed via the at least one outlet provided in addition to the metering outlet/metering outlets and recirculated. This also results in a continuous product flow through the metering chamber during the "normal" operation of the packaging machine.

As already mentioned, the desired portion of the product flow which is fed to the metering chamber and is removed from the latter via the at least one outlet and recirculated—i.e. that partial flow which flows through the metering chamber without being metered—can be preset virtually as desired in order to meet the requirements of the respectively processed product. In this connection, it has proven expedient, for example, if between approximately 1% by mass and approximately 20% by mass, in particular between approximately 2% by mass and approximately 10% by mass, of the product flow supplied to the metering chamber via its at least one inlet is removed again past the at least one metering member via the at least one outlet, while between approximately 80% by mass and approximately 99% by mass, in particular between approximately 90% by mass and approximately 98% by mass, of the supplied product flow is fed by means of the at least one metering member in a metered and portioned manner via the at least one metering outlet to a (respective) package.

In an advantageous configuration, it can furthermore be provided in respect of the apparatus that the at least one metering member is arranged at a small radial distance in relation to the entire cross section of the metering chamber from the circumferential wall of the metering chamber. The metering member can preferably firstly have a metering cylinder which is shiftable in the axial direction of the metering chamber and the free end side of which can be brought into sealing contact in a metering position with a circumferential portion of the at least one metering outlet, and secondly can have a metering piston which is shiftable in the axial direction in the metering cylinder. Consequently, the metering cylinder of a respective metering member is shiftable in the interior of the metering chamber, which is filled with product during the operation, between a metering position, in which said metering cylinder sealingly surrounds the metering outlet, and a suction position, in which said metering cylinder is arranged at an axial distance from the metering outlet, while the metering piston is likewise shiftable in the axial direction in the interior of the metering piston in order, in the metering position thereof, to be able to discharge the desired product portion from the metering chamber via the respective metering outlet.

Furthermore, it may be of advantage in the case of such a metering member in respect of simple cleaning or flushing, such as, in particular, "CIP" cleaning, of the packaging machine if the metering piston of the at least one metering member, which metering piston is arranged in the interior of the metering chamber can be brought into a position outside the metering cylinder, and/or the metering cylinder of the at least one metering member, which metering cylinder is arranged in the interior of the metering chamber, can be brought into a position in which it is arranged at a significant distance both radially and axially from the walls of the metering chamber, such that all of the components of the metering member/metering members can be completely flushed around by a cleaning agent if such a cleaning agent is conducted through the metering chamber.

In a development of the method according to the invention, it can furthermore be provided, in an advantageous embodiment, that the portion of the product flow removed from the metering chamber via the at least one outlet is buffered in a volume compensator arranged downstream of the at least one outlet. It is thereby possible to buffer, i.e. to temporarily store, the partial flow of product which does not arise continuously at the at least one outlet of the metering chamber in the volume compensator because of the metering operations, during which product portions are transferred cyclically or semi-continuously from the at least one metering outlet into a respective package by means of the at least one metering member, and which partial flow of product flows through the metering chamber during the metering operation, and therefore said partial flow can be conveyed further continuously downstream of the volume compensator and recirculated.

In respect of the apparatus, a packaging machine according to the invention consequently preferably provides that a volume compensator—arranged in particular in the recirculation line—is arranged downstream of the at least one outlet in order to buffer or to temporarily store the product removed from the metering chamber via the at least one outlet. The volume compensator here can comprise, for example, a piston/cylinder unit, the piston of which is shiftable with respect to the cylinder in order to change the volume of the volume compensator. By axial shifting of the piston relative to the cylinder, the volume of said piston is consequently changeable in accordance with the product (partial) flow specifically removed from the at least one outlet of the metering unit. This can take place, for example, by use being made of a piston/cylinder unit which is pressurized fluidically, for example pneumatically, and the pressurization of which can serve at the same time for setting the desired pressure in the metering chamber.

With regard to simple cleaning or flushing, in particular in the manner of a "CIP" of the volume compensator configured in the form of a piston/cylinder unit, it can furthermore be of advantage here if the piston of said piston/cylinder unit can be brought into at least one passage position in which it is arranged at a radial distance from the circumferential wall of the cylinder, and therefore the inlet opening of the volume compensator is connected past the piston to the outlet opening. Consequently, the inner walls of the cylinder and also the piston can be brought entirely into contact with a cleaning medium flowing therethrough in order to clean the full surface area.

Furthermore, it may, of course, be expedient if a valve, in particular in the manner of a ballcock, is arranged downstream of the at least one metering outlet of the metering chamber, in order to be able to close the at least one metering outlet at least during the operating phases of suction and portioning of the product and also in particular during downtimes or during the start-up of the packaging machine when the product is conducted partially or entirely through the metering chamber from the at least one inlet thereof into the at least one outlet thereof.

While the metering chamber of a packaging machine according to the invention may, of course, accommodate only one metering member and, in this case, customarily has an inlet, an outlet and a metering outlet assigned to the metering member, it is in particular also possible that at least two, in particular precisely two, metering members for metering at least two product portions are arranged in the metering chamber.

In this case, the metering chamber expediently has at least two, in particular precisely two, metering outlets assigned to a respective metering member. While the metering chamber may also have a single inlet common to the metering members, it may furthermore preferably likewise have at least two, in particular precisely two, inlets assigned to a respective metering member in order to ensure an exact charging of the metering chamber even with relatively highly viscous products. Furthermore, an outlet of the metering chamber that is common to the metering members, or at least two outlets of the metering chamber that are assigned to a respective metering member can be provided, wherein a common outlet generally suffices to carry out the function intended therefore and is then adjoined by the recirculation line, preferably with the above-described volume compensator.

Further features and advantages of the invention emerge from the description below of an exemplary embodiment with reference to the drawings, in which:

DESCRIPTION OF THE PREFERRED EMBODIMENT

Figure 1:
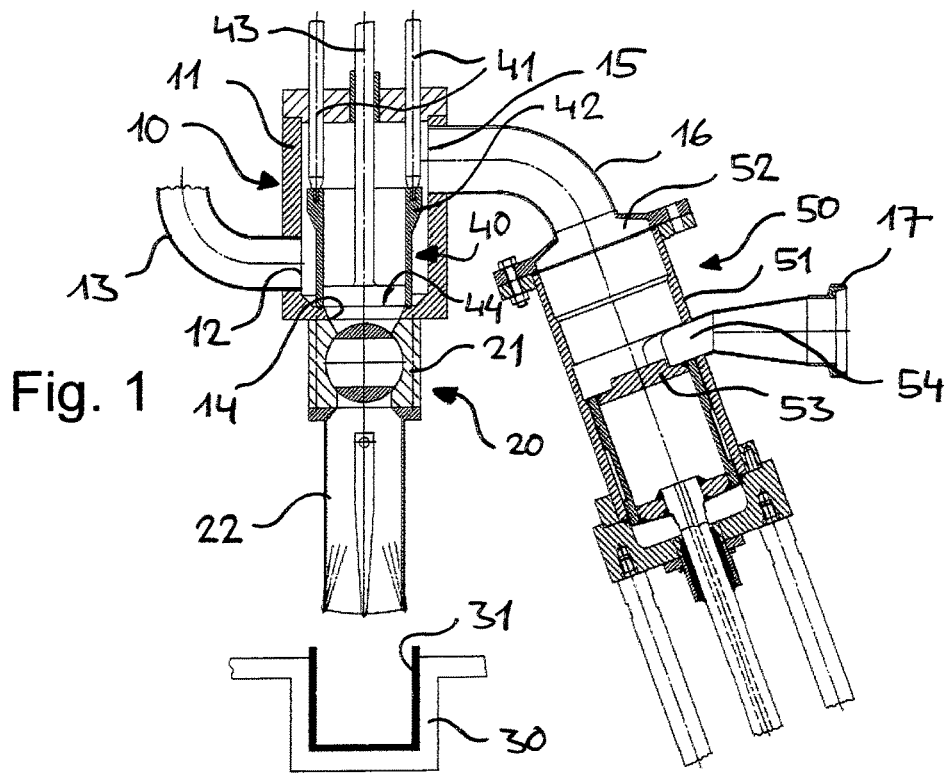
FIG. 1 shows a schematic cross-sectional view of an embodiment of a metering unit according to the invention of a packaging machine (otherwise not illustrated specifically) for packaging liquid or pasty products, during the operating state at the beginning of the suction of the product by means of the metering member.
Figure 2:
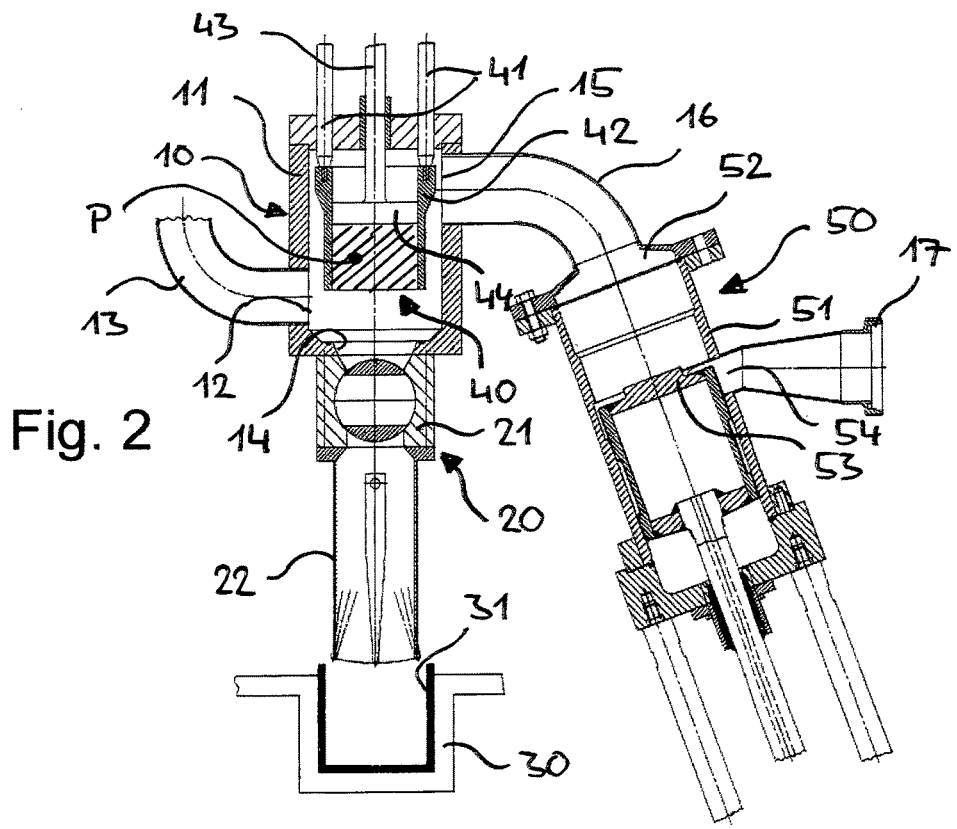
FIG. 2 shows the metering unit according to FIG. 1 during the operating state at the end of the suction of the desired product portion.
Figure 3:
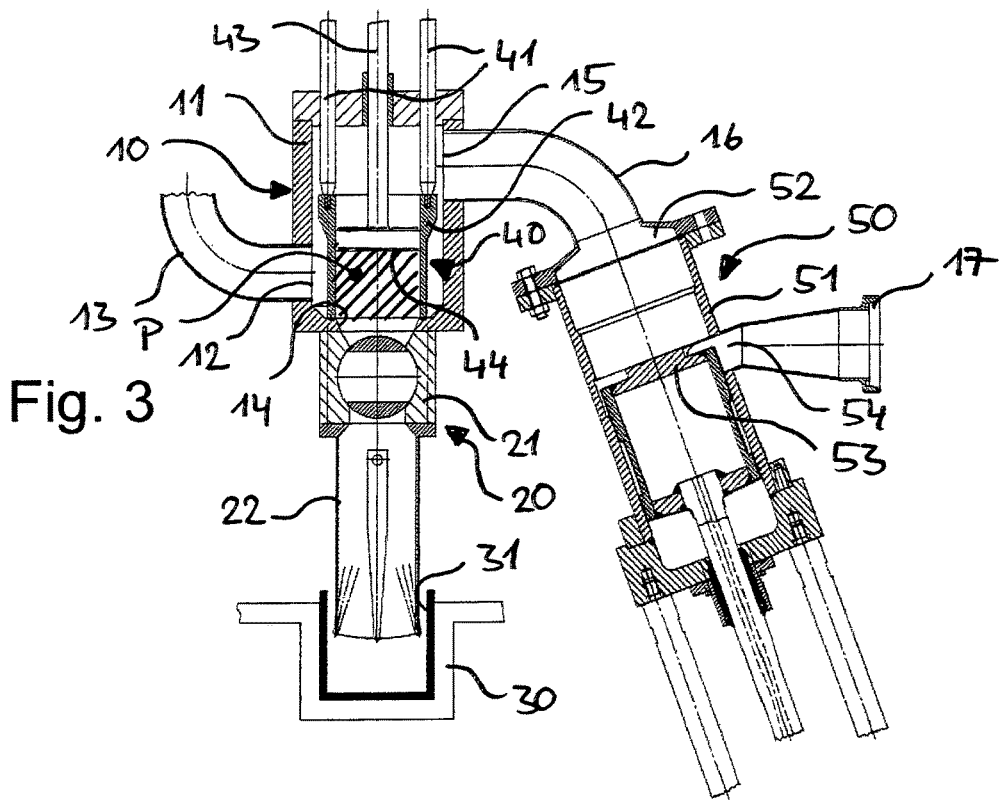
FIG. 3 shows the metering unit according to FIGS. 1 and 2 directly before the beginning of the discharge of the metered product portion from the metering outlet of the metering chamber.

FIGS. 1 to 3 schematically reproduce an exemplary embodiment of a metering unit of a packaging machine (otherwise not illustrated specifically) for packaging a liquid and/or pasty packaging product which is sensitive to untimely separating out or crystallizing out, such as, for example, margarine. The packaging machine can otherwise be substantially configured as per the prior art and in particular can have a plurality of metering units, which are operated in parallel, of the type shown.

The metering unit comprises a metering chamber 10, the cylindrical, although not necessarily circularly cylindrical, housing 11 of which firstly has an inlet 12, for example an inlet which leads radially into said housing and to which an inlet line 13 is connected and which serves for feeding the packaging product into the metering chamber 10, for example by means of a pump (not shown) connected to the inlet line 13. The housing 11 of the metering chamber 10 secondly has a metering outlet 14 which leads out radially on the lower side thereof and by means of which a product portion metered in the metering chamber 10 can be discharged from the metering chamber 10. A valve 20—here in the form of a ball valve—is provided directly adjoining the metering outlet 14, the valve housing 21 of which valve is fixed, for example, directly to the housing 11 of the metering chamber 10. A metering tip 22 is placed on that side of the valve 20 which is opposite the metering outlet 14. Located below the metering tip 22 are vertically shiftable lifting cells 30 which serve to accommodate suitable packages 31, such as prefolded and upwardly open wrappers, cups or the like, to which the metered product portion can be fed. The lifting cells 30 can be moved past below the metering tips 22 in a manner known as such in order to supply empty packages 31 and to remove ready filled packages 31.

Located in the interior of the metering chamber 10 is a metering member 40 which, in the present exemplary embodiment, firstly has a metering cylinder 42 which is shiftable in the axial direction of the metering chamber 10, for example by means of suitable piston/cylinder units 41, and is open on both end sides, and secondly it has a metering piston 44 which is likewise shiftable in the axial direction of the metering chamber 10 and also relative to the metering cylinder 42, for example, likewise by means of suitable piston/cylinder units 43. The metering cylinder 42 is shiftable here in such a manner that its final, free end side (the lower end side in the drawings) firstly can be brought into sealing contact with a circumferential portion of the housing 11 of the metering chamber 10, said circumferential portion surrounding the metering outlet 14 (cf., for example, FIGS. 1 and 3 to 5) and, secondly, can be transferred into at least one position in which said metering cylinder is arranged at a distance from the metering outlet 14 and in particular also at a distance from the side (the upper side in the drawings) of the housing 11 of the metering chamber 14, which side is opposite the metering outlet 14 (cf., for example, FIGS. 2 and 6). The metering piston 44 is firstly, as mentioned above, shiftable axially in the interior of the metering cylinder 42 (cf., for example, FIGS. 1 to 5) and can secondly also be shifted into a position in which said metering piston is located outside, for example below, the metering cylinder 42, but at a distance from the housing 11 of the metering chamber 10 (cf., for example, FIG. 6). Furthermore, the metering cylinder 42 is arranged at a radial distance on all sides from the inner circumferential wall of the housing 11 of the metering chamber 10, and therefore an annular gap is always formed between said metering chamber and the outer circumference of the metering cylinder 42, the width of which annular gap is preferably small in comparison to the diameter of the metering cylinder 42.

In addition to the inlet 12 and the metering outlet 14, the housing 11 of the metering chamber 10 has an outlet 15 which, for example—similarly to the inlet—leads radially into the metering chamber 10 and to which an outlet line 16 is connected which forms a first portion of a recirculation line or return line 17. In the present case, the outlet 15 can serve both for the (entire) continuous flow operation of the metering chamber 10 during downtimes of the packaging machine and/or during the start-up thereof (the metering outlet 14 is then closed in particular by means of the valve 20) and also for the (partial) continuous flow operation of the metering chamber 10 during the customary packaging operation by a partial flow of the liquid/viscous or pasty packaging product supplied via the inlet 12 being continuously removed via the outlet 15 and recirculated again into the inlet 12. While the inlet 12 in the present case is positioned at the lower end of the housing 11 of the metering chamber 10, which end faces the metering outlet 14, the outlet 15 is arranged at the upper end of the housing 11 of the metering chamber 10, which upper end is axially opposite the inlet 12 and faces away from the metering outlet 14, and therefore the packaging product can flow substantially through the entire metering chamber 10 without being able to be locally enriched. As already indicated, the outlet line 16 connected to the outlet leads—with the intermediate arrangement of a volume compensator 50 (explained in more detail further below)—into the actual recirculation line or return line 17 which leads in turn into the inlet line 13 (not shown).

The outlet line 16 arranged downstream of the outlet 15 of the metering chamber 10 is adjoined by a volume compensator 50 which serves to buffer or to temporarily store the partial flow of the packaging product that does not necessarily occur continuously and with which the metering chamber 10 is operated in continuous flow during the operation and which is removed via the outlet 15 thereof. In the present exemplary embodiment, the volume compensator 50 is designed in the form of a piston/cylinder unit, the cylinder 51 of which firstly has an inlet opening 52 which is connected to that end of the outlet line 16 which faces away from the outlet of the metering chamber 10, and secondly has an outlet opening 54. The piston 53 of the piston/cylinder unit of the volume compensator 50, for the purpose of changing the receiving volume thereof, is guided shiftably in the axial direction of the cylinder 51 and, in the operating states of the packaging machine that are shown in FIGS. 1 to 5, lies in a sealing manner against the inner circumferential wall of the cylinder 51. As is apparent from FIG. 6, the piston 53 of the volume compensator 50 can furthermore be shifted into a passage position in which it is located between the inlet opening 52 and the outlet opening 54 and is arranged at a radial distance from the circumferential wall of the cylinder 51 such that the inlet opening 52 of the volume compensator 50 is connected to the outlet opening 54 past the piston 53 in order to be able to flush all of the components of the volume compensator 50 that enter into contact with the packaging product, in particular in a simple manner (FIG. 6). As is apparent from the drawings, this is ensured, for example, by interacting radial recesses or projections, on the one hand, on the outer circumference of the piston 53 and, on the other hand, on the inner circumference of the circumferential wall of the cylinder 51.

It should be expressly pointed out at this juncture that the metering chamber 10 can in particular also accommodate a plurality of metering members 40, for example two metering members, which are accommodated next to each other in the housing 11 of said metering chamber (not illustrated in the drawings). In this case, the metering members 40, the design of which can be identical to that of the previously described metering members 40, are in each case assigned a metering outlet 14 and also preferably a respective inlet 12, wherein, in principle, a single inlet 12 common to the metering members 40 can also be provided, which inlet then expediently leads into a portion of the metering chamber 10 that is arranged between the metering members 40. An outlet 15 of the metering chamber 10, which outlet is common to the metering members 40, is then adjoined by, for example, the volume compensator 50.

The packaging operation of the packaging machine is explained in detail below with reference to FIGS. 1 to 5:

The pasty packaging product, which can be—as mentioned above—for example margarine which is sensitive in the inoperative state to separating out and/or crystallization, is supplied to the inlet 12 of the metering chamber 10 via the inlet line 12, in particular substantially continuously or with an approximately constant mass flow, wherein a main portion of the supplied product flow, such as, for example, between approximately 90% by mass and approximately 90% by mass of same, is metered in the metering chamber 10 by means of the metering member 40 to form a product portion and said product portion is fed via the metering outlet 14 to the package 31 which is arranged in a respective lifting cell 30 and is closed in a subsequent step (not shown). The remaining portion of the product flow supplied to the metering chamber 10, such as, for example, between approximately 2% by mass and approximately 10% by mass of same, is transferred through the metering chamber 10 out of the outlet 15 of the metering chamber 10 into the outlet line 16 and from there into the volume compensator 50, from where said mass passes into the recirculation line 17 and finally circulates into the inlet line 13 again. The metering chamber 10 is always entirely filled here with the pasty product.

The operating situation illustrated in FIG. 1 illustrates the situation at the beginning of the suction of a product portion by means of the metering member 40. The metering cylinder 42 is in its lower position in which it lies tightly against the circumference of the metering outlet 14; the metering piston 44 is likewise in its lower position in which it closes the (lower) end of the metering cylinder 42 that faces the metering outlet 14 and is approximately aligned with its (lower) end. The valve 20 is closed and the piston 53 of the volume compensator 50 is arranged in a position in which it opens up a large, for example the maximum, filling volume of the cylinder 51 and ensures passage of the product out of the outlet opening 54. The lifting cell 30 equipped with the package 31 is located at a distance below the metering tip 22.

For the suction of the desired product portion, the metering cylinder 42 of the metering member 40 is then shifted axially by means of the piston/cylinder units 41 into an upper position spaced apart from the metering outlet 14, while the metering piston 44 is shifted axially upward by means of the piston/cylinder unit 43 firstly by a corresponding shifting distance and secondly by an additional shifting distance relative to the metering cylinder 42, wherein the additional shifting distance is set corresponding to the desired product portion P, which is indicated shaded in FIG. 2 and which is then located within the metering cylinder 42. The piston 53 of the volume compensator 50 is shifted here somewhat into the interior of the cylinder 51, and therefore the internal volume of the latter is reduced, as a result of which the difference in the volume firstly of the product portion P sucked up by means of the metering member 10 and secondly of the product continuing to be fed in to the metering chamber 10 via the inlet 13 in the meanwhile is compensated for. Nevertheless, the outlet opening 54 still corresponds to the interior of the cylinder 51 of the volume compensator 50. During the suction, the lifting cell 30 equipped with the package 31 is shifted upward in the direction of the metering tip 22. The operating situation shown in FIG. 2 therefore illustrates the situation at the end of the suction of the product portion P by means of the metering member 40.

As can be gathered from FIG. 3, after the product portion P is sucked into the interior of the metering cylinder 42, the metering cylinder 42 and the metering piston 42 of the metering member 40 are shifted synchronously downward in the direction of the metering opening 14 such that the metering cylinder 42 enters into sealing contact with the circumference of the metering outlet 14, as is also the case in the situation shown in FIG. 1. The valve 20 is closed as before; the lifting cell 30 with the package 31 has been shifted yet further upward in the direction of the metering tip 22. The piston 53 of the volume compensator 50 has somewhat increased the interior volume of the cylinder 51 again in relation to the situation according to FIG. 2 in order to buffer or to temporarily store the product flow fed continuously to the metering chamber 10 via the inlet 12 thereof—or more precisely: that portion of said product flow which is removed via the outlet 15.

Figure 4:
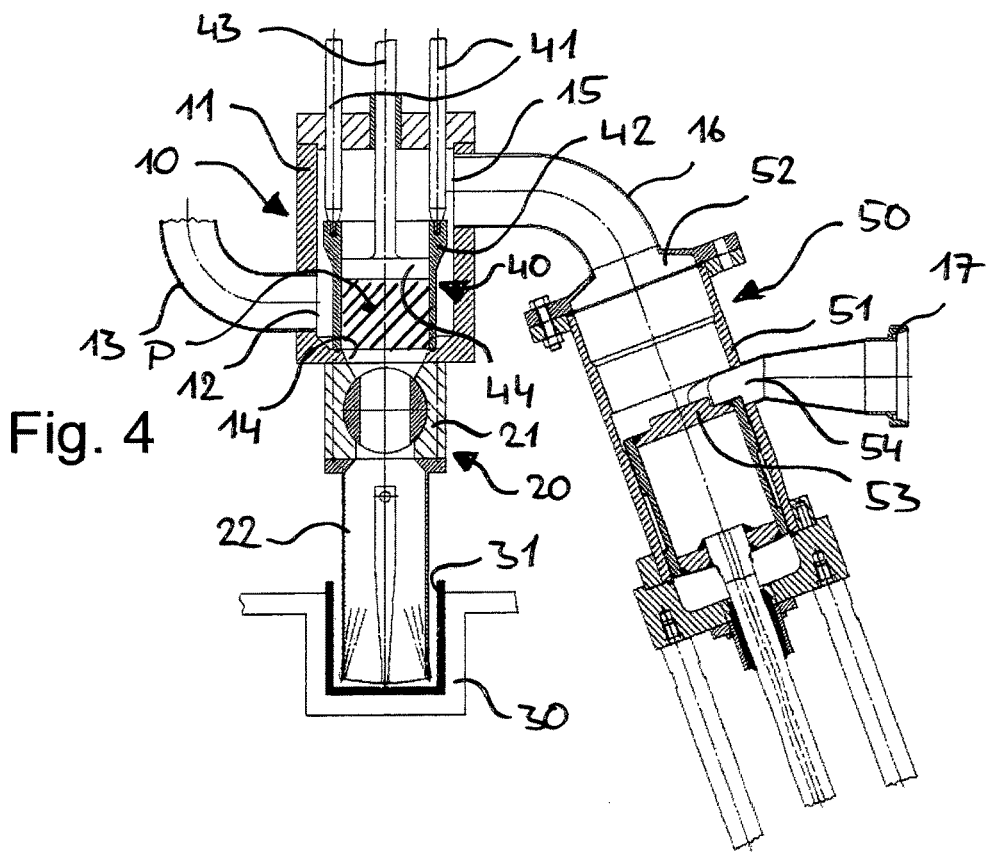
FIG. 4 shows the metering unit according to FIGS. 1 to 3 at the beginning of the discharging of the metered product portion from the metering outlet of the metering chamber.

FIG. 4 shows the operating situation directly before the metered product portion P begins to be squeezed out of the metered outlet 14, and differs from the situation according to FIG. 3 firstly in that the lifting cell 30 provided with the package 31 has reached its upper position, in which the metering tip 22 submerges virtually entirely into the package 31 in order to ensure an increasing feed of product into the package 31. Secondly, the valve 20 has been (just) opened. Furthermore, the piston 53 of the volume compensator 50 has increased the interior volume of the cylinder 51 by a further amount in relation to the situation according to FIG. 3 in order to buffer the product flow fed continuously to the metering chamber 10 via the inlet 12 thereof or the partial flow of said product flow that is removed via the outlet 15.

Figure 5:
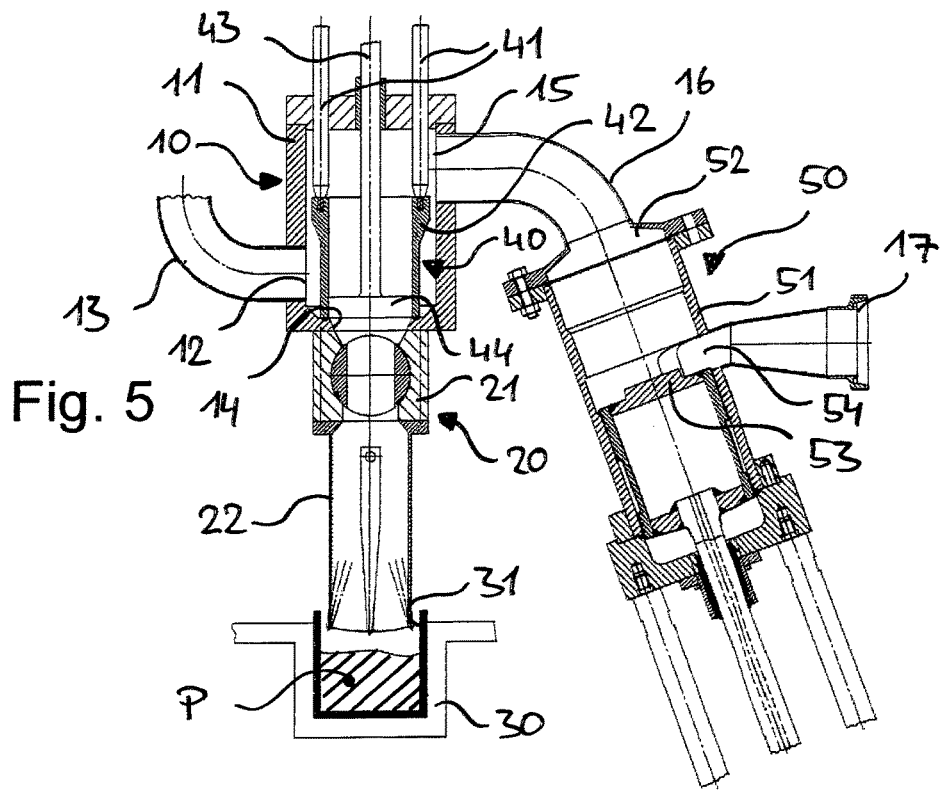
FIG. 5 shows the metering unit according to FIGS. 1 to 4 at the end of the discharging of the metered product portion from the metering outlet of the metering chamber.
Figure 6:
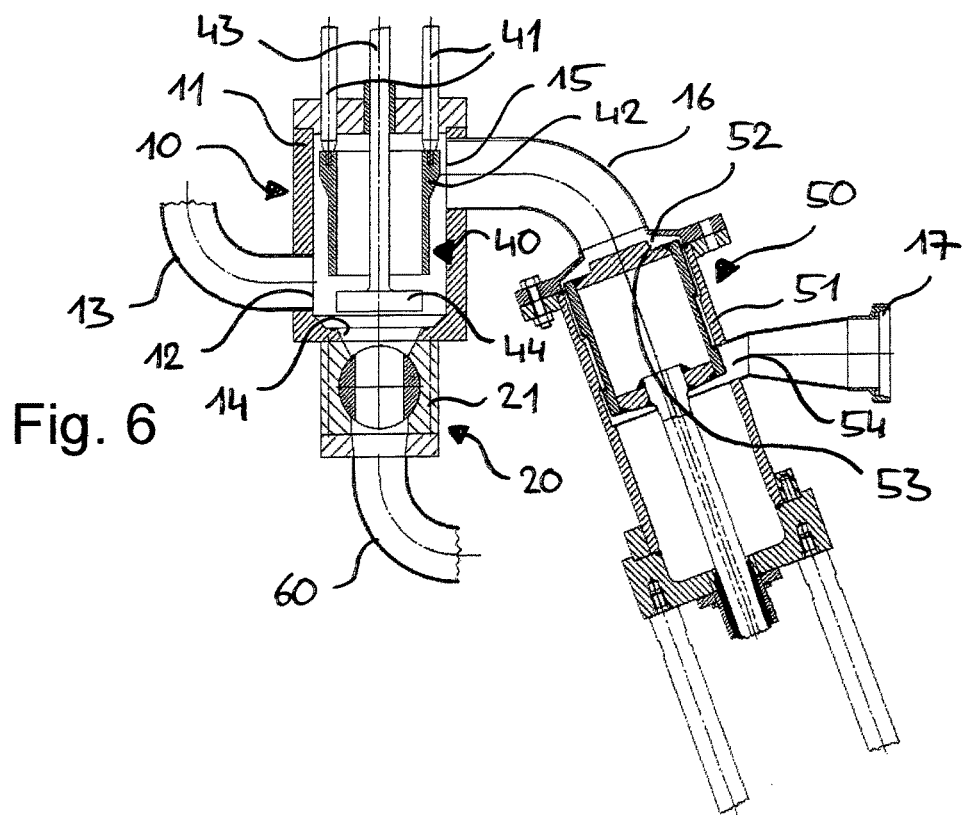
FIG. 6 shows the metering unit according to FIGS. 1 to 5 during the cleaning of same.

FIG. 5 finally reproduces the operating situation at the end of the squeezing-out operation of the product portion P. As can be seen there, the metering cylinder 42 of the metering member 40 is situated, as before, in the (lower) position shown in FIG. 4 while the metering piston 44 has by contrast been shifted downward in the direction of the metering outlet 14 in order to transfer the metered product portion P through the—open—valve 20 into the package 31 which has been shifted a distance downward, i.e. away from the metering tip 22, by means of the lifting cell 30 in accordance with the rising filling level in the package 30. The piston 53 of the volume compensator 50 has increased the interior volume of the cylinder 51 by a further amount in relation to the situation according to FIG. 4 in order to buffer the product flow fed continuously to the metering chamber 10 via the inlet thereof or the partial flow of said product flow that is removed via the outlet 15.

Finally, the package which is ready filled with the metered product portion P is shifted downward again by means of the lifting cell 30 into the position reproduced in FIG. 1 and transported away, after which a new lifting cell 30 equipped with an empty package 31 is transported up (see FIG. 1). The valve 20 is closed, and therefore the operating situation illustrated in FIG. 1 arises again and a new metering operation can follow.

FIG. 6 shows the situation of the packaging machine during a cleaning or flushing operation as is required, for example, in the event of a product change. For this purpose, the metering tip 22 can be removed, for example, from the housing 21 of the valve 20 and instead a cleaning outlet line 60 can be connected to the valve 20. A cleaning medium is then supplied to the metering chamber 10 via the inlet line 13 leading into the inlet 12 thereof and is removed firstly via the open valve 10 and the cleaning outlet line 60 connected thereto, and secondly via the outlet 15 thereof, wherein, downstream of the outlet 15, the cleaning medium passes the outlet line 16, the volume compensator 50 and the circulation line 17 connected to the outlet opening 54 thereof. Complete flushing of all of the surfaces of the packaging machine that have previously come into contact with the packaging product is possible in particular by the fact that the metering cylinder 42 of the metering member 40 is shifted into a position—approximately corresponding to the situation in FIG. 2—in which said metering cylinder is arranged at a distance from the metering outlet 14 and also at a distance from the end side of the housing 11 of the metering chamber 10, which end side is axially opposite the metering outlet 14, and therefore said metering cylinder is flushed around both on the inside and on the outside by the cleaning medium. The metering piston 44 has been shifted into a position outside the metering cylinder 42 and in particular both at a distance below same and also at a distance from the metering outlet 14, and therefore said metering cylinder is also flushed around by the cleaning medium. The same applies both to the cylinder 51 and to the piston 51 of the volume compensator 50, which piston has been brought into a position relative to the cylinder 51, in which position said piston is located between the inlet opening 52 and the outlet opening 54 and, as a result of the radial or circumferential recesses or projections, is also arranged at a distance from the inner circumferential wall of the cylinder 51 with an annular gap being formed.

If the pasty packaging product is intended only to be circulated during temporary downtimes and/or during the start-up of the packaging machine, in order to avoid local crystallizing out/separating out of said packaging product (not reproduced in the drawings), the metering cylinder 42 and the metering ram 44 of the metering member 40 can be brought, for example, into a position corresponding to FIG. 6, wherein the valve 20 is, of course, in such a situation in the closed position (corresponding to FIGS. 1 to 3). For this purpose, the piston 51 of the volume compensator 50 can be shifted, for example, into a position which corresponds to FIG. 5 and in which said piston virtually entirely opens up the outlet opening 54 and therefore ensures an unobstructed passage of the product which, after flowing through the metering chamber 10, flows through the volume compensator.

I claim:
1. A method for portioned packaging of liquid and/or pasty products by means of a packaging machine by the product being fed via at least one inlet to a metering chamber and metered in the metering chamber by means of at least one metering member having an axially shiftable metering piston to form at least one product portion, with the at least one product portion being fed via at least one metering outlet to a package, the method comprising the steps of:
   a) feeding the product into the at least one inlet at at least one end, thereby causing the product to flow through the metering chamber in an axial direction;
   b) guiding the product past the at least one metering member through an annular gap formed between the at least one metering member located in the metering chamber and an inner circumferential wall of the metering chamber, wherein the product thereby flushes around the metering member;
   c) removing the product entirely or partially from the metering chamber from another end via the at least one outlet; and
   d) recirculating the product, wherein the metering chamber is operated in continuous flow during at least one operating state of the packaging machine selected from an operating state group consisting of operating state downtimes of the packaging machine, operating state start-up of the packaging machine, and operation of the packaging machine.

2. The method of claim 1, wherein the metering chamber is operated in continuous flow both during downtimes and/or upon start-up of the packaging machine and also during the operation of the packaging machine.

3. The method of claim 1, wherein the product is fed to a lower end and/or to an end facing the at least one metering outlet of the metering chamber via the at least one inlet and is removed from an upper end and/or from an end facing away from the at least one metering outlet of the metering chamber via the at least one outlet.

4. The method of claim 1, wherein a greater product flow is fed to the metering chamber during operation via the at least one inlet than is removed in a portioned manner therefrom via the at least one metering outlet, wherein a portion of the product flow fed to the metering chamber that is not removed in a portioned manner therefrom via the at least one metering outlet is removed via the at least one outlet and recirculated.

5. The method of claim 4, wherein the product is fed substantially continuously.

6. The method of claim 4, wherein a desired portion of the product flow fed to the metering chamber that is removed via the at least one outlet and recirculated is preset.

7. The method of claim 4, wherein between 1% by mass and 20% by mass or between 2% by mass and 10% by mass, of the product flow supplied to the metering chamber via the at least one inlet is removed again downstream of the at least one metering member via the at least one outlet, while between 80% by mass and 99% by mass or between 90% by mass and 98% by mass, of the supplied product flow is fed by means of the at least one metering member in a metered and portioned manner to a package via the at least one metering outlet.

8. The method of claim 4, wherein the portion of the product flow removed from the metering chamber via the at least one outlet is buffered in a volume compensator downstream of that outlet.

9. A packaging machine for the portioned packaging of liquid and/or pasty products, the packaging machine comprising:
  at least one metering chamber having at least one metering chamber inlet disposed at a first end region of said metering chamber to feed the product into said metering chamber, at least one metering chamber outlet disposed at a second end region of said metering chamber axially opposite said first end region, and at least one metering outlet;
  at least one metering member disposed within said metering chamber, said metering member having an axially shiftable metering piston for metering out at least one product portion to said at least one metering outlet in order to feed the product portion to a package, wherein said at least one metering member is disposed at a radial separation from an inner circumferential wall of said metering chamber such that the product is guided past said at least one metering member through an annular gap formed between said at least one metering member and said inner circumferential wall of said metering chamber; and
  a recirculation line communicating with said metering chamber outlet, wherein the product is supplied to said metering chamber via said at least one metering chamber inlet and is entirely or partially removed from said metering chamber via said at least one metering chamber outlet and passed into said recirculation line.

10. The packaging machine of claim 9, wherein said at least one metering chamber inlet is arranged at a lower end and/or at an end facing said at least one metering outlet, and said at least one metering chamber outlet is arranged at an upper end and/or at an end facing away from said at least one metering outlet of said metering chamber.

11. The packaging machine of claim 9, wherein said at least one metering member is arranged at a small radial distance from said circumferential wall of said metering chamber, relative to an entire cross section of said metering chamber.

12. The packaging machine of claim 9, wherein said at least one metering member has a metering cylinder which is shiftable in an axial direction of said metering chamber and a free end side of which is brought at a metering position into sealing contact with a circumferential portion of said at least one metering outlet, wherein said at least one metering member also has a metering piston which is shiftable in said axial direction within said metering cylinder.

13. The packaging machine of claim 12, wherein said metering piston of said at least one metering member is disposed in an interior of said metering chamber and can be displaced into a position outside said metering cylinder, and/or said metering cylinder of said at least one metering member is disposed in an interior of said metering chamber and can be displaced into a position which is substantially distant, both radially and axially, from walls of said metering chamber.

14. The packaging machine of claim 9, further comprising a volume compensator disposed downstream of said at least one metering chamber outlet in order to buffer the product removed from said metering chamber via said metering chamber outlet, wherein said volume compensator comprises a piston/cylinder unit having a piston which is shifted with respect to a cylinder in order to change a volume of said volume compensator.

15. The packaging machine of claim 14, wherein said piston of said piston/cylinder unit can be brought into at least one passage position in which it is disposed at a radial distance from a circumferential wall of said cylinder, wherein an inlet opening of said volume compensator is thereby connected past said piston to an outlet opening.

16. The packaging machine of claim 9, further comprising a valve or a ballcock disposed downstream of said at least one metering outlet.

17. The packaging machine of claim 9, wherein at least two or precisely two metering members are disposed in said metering chamber for metering at least two product portions.

18. The packaging machine of claim 17, wherein said metering chamber has at least two or precisely two metering outlets assigned to a respective metering member and/or at least two or precisely two inlets assigned to a respective metering member.

* * * * *